(12) United States Patent
Chalupa et al.

(10) Patent No.: US 8,485,227 B2
(45) Date of Patent: Jul. 16, 2013

(54) APPARATUS FOR PROVIDING CONDITIONED FLUID FLOWS

(75) Inventors: Stefan Chalupa, Schoental (DE); Mario Reiher, Pfedelbach (DE); Johann Gunnesch, Waldenburg (DE); Jan Schuler, Niedernhall (DE); Gunter Kabisch, Niedernhall (DE); Juergen Wiedemann, Ingelfingen (DE)

(73) Assignee: Buerkert Werke GmbH, Ingelfingen (DE)

( * ) Notice: Subject to any disclaimer, the term of this patent is extended or adjusted under 35 U.S.C. 154(b) by 232 days.

(21) Appl. No.: 12/836,614

(22) Filed: Jul. 15, 2010

(65) Prior Publication Data

US 2011/0011478 A1    Jan. 20, 2011

(30) Foreign Application Priority Data

Jul. 17, 2009   (DE) ............. 20 2009 009 759 U

(51) Int. Cl.
*F15D 1/02*    (2006.01)
(52) U.S. Cl.
USPC ............................. 138/44; 138/94
(58) Field of Classification Search
USPC ...................................... 138/44, 94
See application file for complete search history.

(56) References Cited

U.S. PATENT DOCUMENTS

| | | | | |
|---|---|---|---|---|
| 2,497,978 | A | * | 2/1950 | Henning ..................... 138/44 |
| 3,792,609 | A | * | 2/1974 | Blair et al. ................. 73/861.52 |
| 4,781,536 | A | | 11/1988 | Hicks |
| 4,800,754 | A | * | 1/1989 | Korpi ....................... 73/202 |
| 5,253,517 | A | | 10/1993 | Molin et al. |
| 5,495,872 | A | * | 3/1996 | Gallagher et al. .......... 138/44 |
| 5,922,970 | A | | 7/1999 | Ohle |
| 6,119,730 | A | | 9/2000 | McMillan |
| 6,247,495 | B1 | | 6/2001 | Yamamoto |
| 2004/0123672 | A1 | | 7/2004 | Wang |
| 2004/0187927 | A1 | | 9/2004 | Kang et al. |
| 2008/0016957 | A1 | | 1/2008 | Suzuki |

FOREIGN PATENT DOCUMENTS

| | | |
|---|---|---|
| DE | 19705660 | 8/1998 |
| DE | 20208716 | 9/2002 |
| DE | 102004019521 | 11/2005 |
| WO | 98/50762 | 11/1998 |

OTHER PUBLICATIONS

German Search Report dated Jan. 14, 2010.
International Search Report dated Sep. 3, 2010.

* cited by examiner

*Primary Examiner* — James Hook
(74) *Attorney, Agent, or Firm* — Carlson, Gaskey & Olds, PC

(57) ABSTRACT

To provide conditioned fluid flows, a base body has a main flow duct formed therein with a bypass duct that is branched off from and led back to the main flow duct. An exchangeable flow conditioning insert includes a flow resistance element and is adapted to be arranged in the main flow duct relative to the bypass duct in an axial installation position such that the flow resistance element generates a pressure difference between ports of the bypass duct at the main flow duct.

15 Claims, 2 Drawing Sheets

APPARATUS FOR PROVIDING CONDITIONED FLUID FLOWS

RELATED APPLICATION

This application claims priority to German Application No. 20 2009 009 759.5, which was filed 17 Jul. 2009.

FIELD OF THE INVENTION

The present invention relates to an apparatus for providing conditioned fluid flows.

BACKGROUND

Conditioned fluid flows play an important role in thermal mass flow rate measuring devices, for example. A flow resistance element generates a low pressure drop in a main flow duct, the pressure drop causing a volume flow rate via a bypass duct which is arranged parallel to the principal duct and in which a flow rate sensor is disposed. Frequently, still further elements controlling the flow are inserted into the main flow duct.

SUMMARY

In one example, a flow conditioning insert is provided for a main flow duct of a base body in a mass flow meter. The insert has at least one flow resistance element arranged therein between two branchings from the main flow duct for a parallel bypass duct.

The flow conditioning insert can be advantageously exchanged in a simple and uncomplicated manner so that, depending on the particular application and in accordance with a desired medium flow, an insert suitable therefor can be selected and used.

The main flow duct includes a widened section limited by a stop and axially accommodating the flow conditioning insert. This has the advantage that a defined axial installation position of the insert is made sure, which ensures the reproducibility of the measured values and thus also the accuracy of the regulated flows.

It has turned out to be particularly convenient if at least one double screen is arranged in the flow conditioning insert upstream of the flow resistance element. The double screen consists of a fine screen and a supporting screen, which constitute a unit and are riveted to each other, for example. The supporting screen serves to stabilize the fine screen, so that the latter withstands even higher back pressures without being deformed or even damaged. The double screen has a filter function and prevents any dirt portions possibly present in the medium from reaching the sensor area. Also, the double screen has the function of homogenizing the flow of the medium, so that, for example, a length and type of pipe section through which the medium flows before entering the main flow duct of the mass flow measuring device does not affect the measuring result.

Flow resistance elements are known per se. They are used for generating as laminar a flow as possible. With a laminar flow, there exists a linear connection between the volume flow rate in the bypass duct and the pressure drop produced by the flow resistance. In dependence on the desired flow rate per unit of time, flow resistance elements having different opening diameters are required: a small flow resistance is required for high volume flow rates, whereas a high flow resistance is needed for low volume flow rates. According to the prior art, a whole range of flow resistance elements is therefore provided for a mass flow rate measuring and control device, which is involved and expensive.

The flow resistance element arranged in the flow conditioning insert therefore constitutes a combination of an orifice plate and a flow conditioning element. The flow conditioning element is built up of a multitude of parallel ducts with a large total opening cross-section and cooperates with orifice plates having different opening diameters. This allows the desired flow range of the flow resistance element to be practically continuously adjustable using just one single flow conditioning element. Costs are reduced considerably because orifice plates having different bore diameters are simple and inexpensive to produce.

One example of the flow conditioning insert is of a substantially tubular design and has a peripheral constriction which, together with the surrounding wall of the main flow duct, forms an annular space. A branching of the main flow duct, which connects the latter with the parallel bypass duct, opens into the annular space. The flow conditioning insert is provided with radial openings in the region of the peripheral constriction, so that medium from the interior of the flow conditioning insert can first flow into the annular space and then into the bypass duct. The radial openings are disposed axially remote from a branching of the main flow duct to the bypass duct, so that they are not aligned therewith.

As a result of this advantageous design relating to the axial stop in the main flow duct, the annular space, the peripheral constriction, and the radial openings in the flow conditioning insert, no orientation of the flow conditioning insert in the main flow duct is required. After a removal and reinsertion of the same flow conditioning insert, a new and time-consuming calibration can thus be dispensed with.

The tubular flow conditioning insert can further include widened portions at its two axial ends in its interior, the widened portions each being limited by a step and having the flow resistance element inserted therein at one end and the at least one double screen at the other end. This defines the positions of the elements in the flow conditioning insert and the distance of the elements from each other, so as to provide defined and reproducible flow conditions.

In one example, the flow conditioning element, which along with an orifice plate constitutes the flow resistance element, is built up of a multitude of parallel ducts, and the walls defining the ducts have very small wall thicknesses. The wall thicknesses are typically in the range of from 0.5 mm to 0.05 mm.

In one example, the flow conditioning element is produced by photopolymerization from a plastic material by growing in layers over an appropriate mask. This has the advantage that the desired small wall thicknesses can be realized, very small tolerances can be observed, and almost any desired duct geometries can be implemented.

A flow conditioning element having approximately trapezoidal duct cross-sections has turned out to be an especially advantageous variant.

BRIEF DESCRIPTION OF THE DRAWINGS

Further advantages and configurations of the invention will now be described with reference to the accompanying drawing figures, in which.

DETAILED DESCRIPTION

Figure 1:
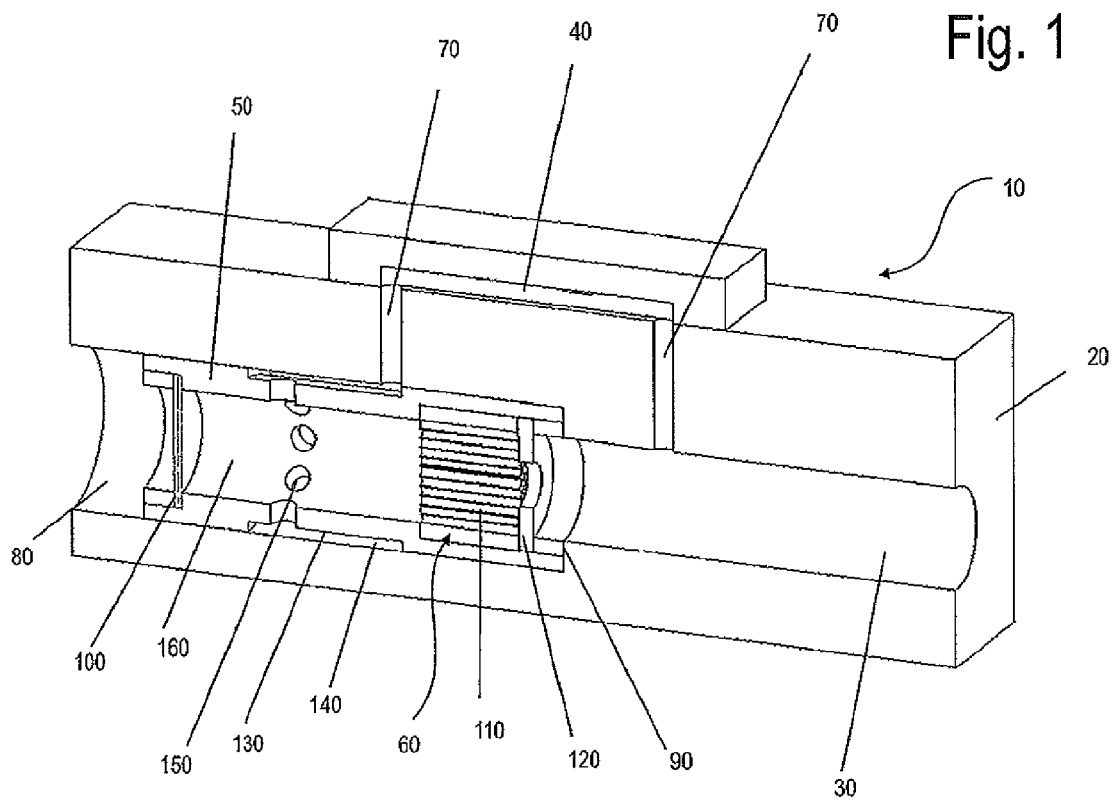
FIG. 1 shows a sectional drawing of an apparatus for providing conditioned fluid flows.

FIG. 1 illustrates a sectional drawing of an apparatus 10, preferably for a mass flow meter, including a base body 20 through which a main flow duct 30 extends, for providing conditioned fluid flows. A bypass duct 40, which is parallel to the main flow duct 30, is branched off from and led back to the main flow duct 30. Axially arranged in the main flow duct 30 is an exchangeable flow conditioning insert 50 with a flow resistance element 60 in such a way that the latter generates a pressure difference between two ports 70 of the bypass duct 40 at the main flow duct 30.

The flow conditioning insert 50 constitutes a compact unit which can also accommodate a plurality of flow conditioning elements. This has the advantage of a simple assembly and uncomplicated cleaning and exchangeability, with the base body 20 of the mass flow measuring device itself remaining unaffected, without having to be disassembled. Depending on the flow range desired, a flow conditioning insert 50 with a flow resistance element 60 adjusted thereto can be selected and inserted alternately.

To accommodate the flow conditioning insert 50, the main flow duct 30 preferably has a section 80 which is widened with respect to the diameter and is limited by a stop 90. This stop defines the axial installation position of the flow conditioning insert 50. In this way, any fluctuations in the measuring system, which might arise due to different positions of the flow conditioning insert 50 in the main flow duct 30, are excluded.

The flow conditioning insert 50 advantageously includes at least one double screen 100 as a further flow conditioning element upstream of the flow resistance element 60. As viewed in the flow direction, the double screen 100 is built up of a fine screen and a supporting screen stabilizing the fine screen, the screens being connected with each other by rivets, for example. It is also possible to arrange a plurality of double screen disks behind each other. The combination of a fine screen and a supporting screen allows a very fine screen to be used even at a high medium pressure, such a very fine screen not having sufficient mechanical strength on its own, but providing a desirable high filter function. This ensures that any dirt particles possibly carried along in the medium can not reach the sensor area.

In addition, the double screen 100 serves to homogenize the flow of the medium. In this way, uniform flow conditions of the medium in the main flow duct are established, which are independent of the flow conditions prevailing prior to the entry of the medium into the main flow duct.

It is of particular advantage to use in the flow conditioning insert 50 a multipart and modular flow resistance element 60 which is structured as a combination of a flow conditioning element 110 and an orifice plate 120. The flow conditioning element 110 is built up of a multitude of parallel ducts with a large total opening cross-section and cooperates with orifice plates 120 having different opening diameters. This allows the desired flow range of the flow resistance element to be continuously adjusted using only one single flow conditioning element, with the order of the two parts, i.e. the flow conditioning element 110 and the orifice plate 120, in the flow conditioning insert 50 not playing a role, which is a further advantage for a simple assembly.

Preferably, the flow conditioning insert 50 is of a tubular design and has a peripheral constriction 130 which, together with the surrounding wall of the main flow duct 30, forms an annular space 140. Radial openings 150 passing from an interior 160 to the outside are applied in the region of the peripheral constriction 130, so that a fluidic communication is produced between the interior 160 of the flow conditioning insert 50 and the annular space 140. The radial openings 150 are disposed axially remote from one of the ports 70 of the bypass duct 40, so that they are not in alignment with the ports 70 thereof.

Since the medium flows from the interior 160 of the flow conditioning insert 50 via the radial openings 150 first into the annular space 140 in the main flow duct 30 and then reaches a port 70 of the bypass duct 40, the flow conditioning insert 50 can be radially arranged in the main flow duct 30 in any desired manner. It is therefore not required to pay attention to any specific positioning during assembly, unlike in an alternative design of a flow conditioning insert without a peripheral constriction and with only one single opening where, in fact, it has to be made sure that this opening is aligned with a port of the bypass duct. As a result, any potential sources of errors during assembly are already excluded by design measures. In addition, any recalibration following a possible removal from and reinstallation of the flow conditioning insert 50 into the main flow duct 30 may be dispensed with.

The flow conditioning insert 50 advantageously includes a respective widened portion at each of its two axial ends in the interior 160, the widened portions each being limited by a step and accommodating the double screen 100 at one end and the flow resistance element 60 or, in one embodiment, the flow conditioning element 110 and the orifice plate 120, at the second end. The two steps define the distance between the double screen and the flow resistance element.

Figure 2:
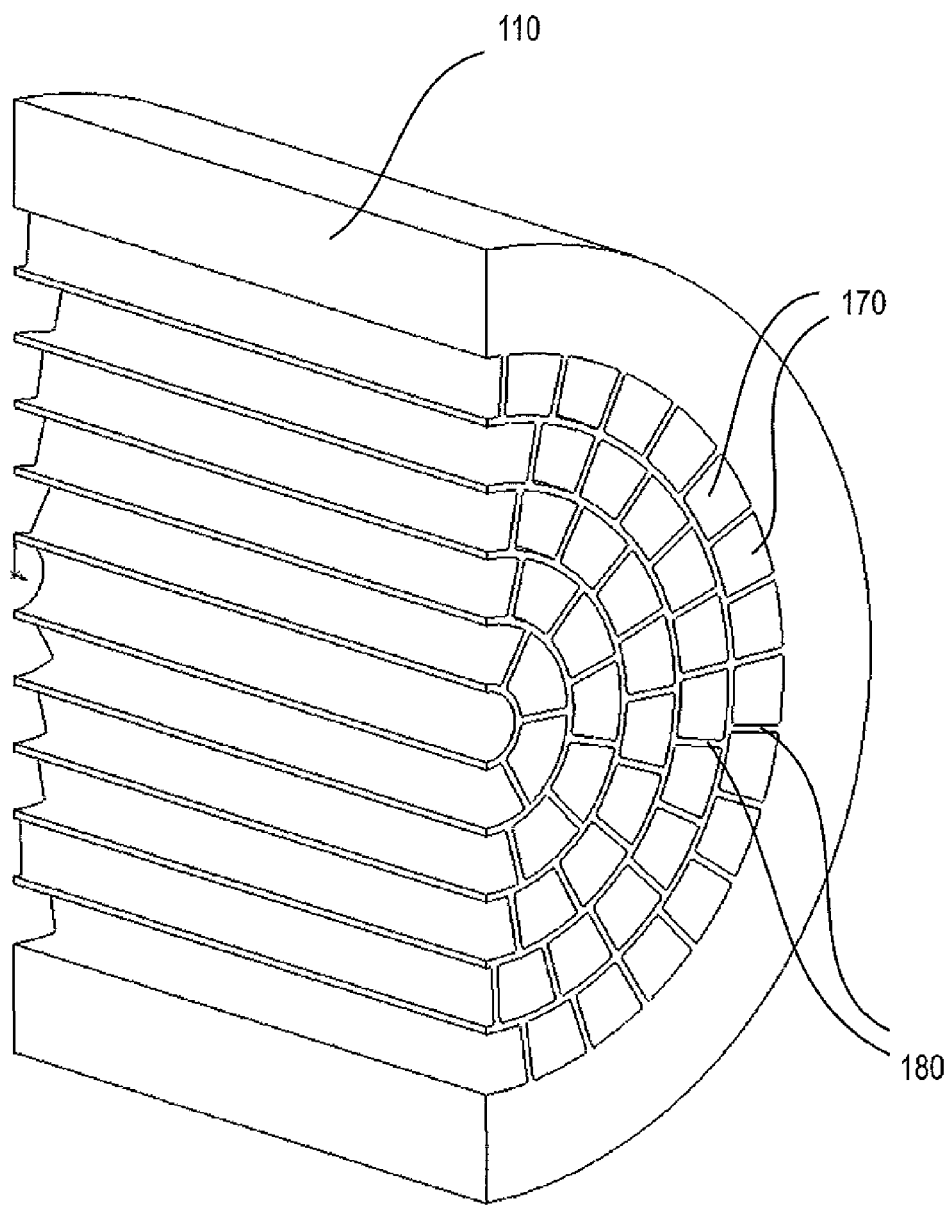
FIG. 2 shows a sectional drawing of a flow conditioning element.

FIG. 2 illustrates a particularly expedient embodiment of a flow conditioning element 110, which includes a multitude of parallel ducts 170 defined by walls 180. The wall thicknesses of the walls 180 are very small and are typically in the range between 0.5 mm and 0.05 mm, as a result of which a construction of many parallel ducts with a large total opening cross-section is implemented.

The flow conditioning element 110 is preferably produced by photopolymerization from a plastic material by growing in layers over an appropriate mask. This has the advantage that the desired small wall thicknesses can be produced while observing very small tolerances. This manufacturing method allows almost any desired duct geometries.

A preferred flow conditioning element 110 includes approximately trapezoidal duct cross-sections as in FIG. 2.

Although the invention has been described hereinabove with reference to a specific embodiment, it is not limited to this embodiment and no doubt further alternatives will occur to the skilled person that lie within the scope of the invention as claimed.

What is claimed is:

1. An apparatus for providing conditioned fluid flows, comprising:
   a base body having a main flow duct formed therein;
   a bypass duct with a port on each end and branched off from and led back to the main flow duct; and
   an exchangeable flow conditioning insert which includes a flow resistance element and is adapted to be arranged in the main flow duct relative to the bypass duct in an axial installation position such that the flow resistance element generates a pressure difference between the ports of the bypass duct at the main flow duct, and wherein the flow conditioning insert includes at least one double screen comprising a fine screen and a supporting screen upstream of the flow resistance element.

2. The apparatus according to claim 1, wherein the main flow duct has a widened section limited by a stop and the flow conditioning insert is adapted to be inserted into the widened section of the main flow duct, the stop defining an axial installation position of the flow conditioning insert.

3. The apparatus according to claim 2, wherein the exchangeable flow conditioning insert extends from a first end to a second end, the first end abutting against the stop at the axial installation position of the exchangeable flow conditioning insert and the second end including the double screen.

4. The apparatus according to claim 3, including a plurality of radial openings formed in the exchangeable flow conditioning insert at a location between the first and second ends such that the radial openings are located between the double screen and the flow resistance element.

5. The apparatus according to claim 3, wherein the exchangeable flow conditioning insert has a peripheral constriction aligned with the plurality of radial openings to provide an annular space between the exchangeable flow conditioning insert and the base body.

6. The apparatus according to claim 1, wherein the flow resistance element comprises of a combination of an orifice plate and a flow conditioning element.

7. The apparatus according to claim 6, wherein the flow conditioning element includes parallel and adjacent ducts that are defined by walls having wall thicknesses of from 0.5 mm to 0.05 mm.

8. The apparatus according to claim 7, wherein the flow conditioning element comprises a photopolymerized element of a plastic material comprising layers grown over an appropriate mask.

9. The apparatus according to claim 7, wherein the flow conditioning element includes ducts having an approximately trapezoidal cross-section.

10. The apparatus according to claim 1, wherein the flow conditioning insert is tubular and provided with a peripheral constriction which, together with a surrounding wall of the main flow duct, forms an annular space communicating with an interior of the flow conditioning insert via radial openings that are axially spaced from one of the ports of the bypass duct.

11. The apparatus according to claim 10, wherein the flow conditioning insert has a widened portion in an interior at one axial end, the widened portion being limited by a step and having the flow resistance element inserted therein.

12. The apparatus according to claim 10, wherein the flow conditioning insert has a widened portion in an interior at one axial end, the widened portion being limited by a step and having a double screen inserted therein.

13. The apparatus according to claim 10, wherein the flow conditioning insert has a first widened portion in an interior at a first axial end, the first widened portion being limited by a first step and having the flow resistance element inserted therein; and wherein the flow conditioning insert has a second widened portion in the interior at a second axial end, the second widened portion being limited by a second step and having a double screen inserted therein.

14. The apparatus according to claim 1, wherein the exchangeable flow conditioning insert is removable from the base body without requiring the base body to be disassembled.

15. The apparatus according to claim 1, wherein the fine screen and supporting screen are attached to each other within the exchangeable flow conditioning insert.

* * * * *